United States Patent
Satapathy

(12) 
(10) Patent No.: US 7,164,756 B1
(45) Date of Patent: Jan. 16, 2007

(54) DATA COMMUNICATION SYSTEM FOR SUPPLEMENTING TELEPHONE CALLS

(75) Inventor: Durga Prasad Satapathy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 332 days.

(21) Appl. No.: 10/368,526

(22) Filed: Feb. 18, 2003

(51) Int. Cl.
*H04M 11/06* (2006.01)

(52) U.S. Cl. .............................. 379/93.03; 379/88.13; 379/93.08; 379/93.23; 379/201.04

(58) Field of Classification Search ............... 379/91.1, 379/93.02, 93.03, 93.23, 93.01
See application file for complete search history.

(56) References Cited

U.S. PATENT DOCUMENTS

| | | | |
|---|---|---|---|
| 5,592,538 A | * | 1/1997 | Kosowsky et al. ...... 379/93.08 |
| 5,825,871 A | | 10/1998 | Mark |
| 5,841,469 A | * | 11/1998 | Freeman et al. .......... 348/14.09 |
| 6,041,104 A | * | 3/2000 | Lipton et al. ............... 379/67.1 |
| 6,091,808 A | * | 7/2000 | Wood et al. ............ 379/201.04 |
| 6,154,528 A | * | 11/2000 | Bennett et al. ........... 379/93.25 |
| 6,226,367 B1 | * | 5/2001 | Smith et al. ........... 379/142.04 |

\* cited by examiner

*Primary Examiner*—Gerald Gauthier

(57) ABSTRACT

A telephone device coupled to the public switched telephone network is utilized by a user to participate in a telephone call between the user and a second party. A data store is provided for storing one or more personal data elements configurable on behalf of the user, the personal data elements being stored according to respective pointers. The data store corresponds to a respective user telephone number. A data interface controller retrieves a particular personal data element in response to a control signal. A control signal generator generates the control signal during the telephone call according to a respective pointer corresponding to the particular personal data element. A data transmitter is coupled to the data interface controller for transmitting the particular personal data element retrieved by the data interface controller to be communicated to the second party.

36 Claims, 3 Drawing Sheets

US 7,164,756 B1

DATA COMMUNICATION SYSTEM FOR SUPPLEMENTING TELEPHONE CALLS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a telephone system, and, more specifically, to a system and method for automatically conveying certain information that is predefined by a user to one or more participants in a telephone call.

A telephone user engaged in a personal or business telephone call often desires to convey certain information to another party participating in the telephone call when performing a personal or business transaction. Examples of information elements that a party may wish to share include the user's street address, e-mail address, facsimile telephone number, instant messaging address, cellular or other mobile telephone number, personal or business webpage address or URL, various number sequences (e.g., social security number, credit card number, and other identification numbers), or other customized elements.

Some types of such information are not very well suited for oral communication (such as long strings of numbers) because of the possibilities of errors in delivering the data and/or in recording the information at the receiving end and because of concerns about privacy. Creation of a text communication to convey the information separately from the telephone call may reduce errors but typically requires significant time and effort. Furthermore, the time and effort of sending a text communication may end up being duplicated many times whenever the same information is sent separately to many different parties as a result of separate telephone calls.

Speaking aloud the desired information elements is often subject to disadvantages of being time consuming and otherwise inconvenient. The information elements themselves may also be difficult to remember, thereby causing the user to divert attention away from the telephone conversation. In order to avoid these problems during a telephone call, the user may often decide to defer conveying the information until after the telephone call is completed (e.g., by sending a follow-up e-mail, fax, or return telephone call). Providing a follow-up action in this way is not very efficient, is subject to undesirable delays, or might be completely forgotten by the user.

SUMMARY OF THE INVENTION

The present invention has the advantages of providing efficient transfer of information elements which is easily initiated during a telephone call, eliminating repeated creation of messages conveying the same information, and providing a framework for structuring the configuration and conveyance of personal information elements into a subscriber service to be provided within a telephone network.

In one aspect of the invention, a data communication system comprises a public switched telephone network and a telephone device coupled to the public switched telephone network and utilized by a user to participate in a telephone call between the user and a second party. A data store is provided for storing one or more personal data elements configurable on behalf of the user, the personal data elements being stored according to respective pointers. The data store corresponds to a respective user telephone number. A data interface controller retrieves a particular personal data element in response to a control signal. A control signal generator generates the control signal during the telephone call according to a respective pointer corresponding to the particular personal data element. A data transmitter is coupled to the data interface controller for transmitting the particular personal data element retrieved by the data interface controller to be communicated to the second party.

DETAILED DESCRIPTION OF PREFERRED EMBODIMENTS

Figure 1:
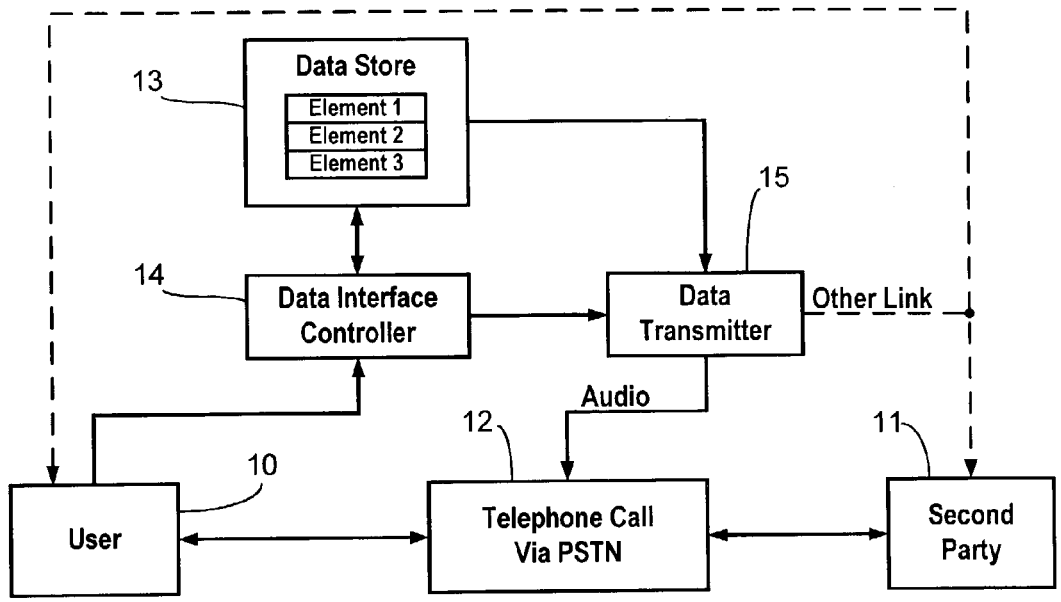
FIG. 1 is a block diagram showing one preferred embodiment of the invention.

Referring to FIG. 1, a user 10 (i.e., customer or subscriber of a telephone network) and a second party 11 participate in a telephone call 12 via a public switched telephone network. The present invention stores personal data elements that may be predefined or configured by user 10 in a data store 13 which may reside locally on the customer premises equipment (CPE) of user 10 or may be stored within the telephone system (such as by the user's local service provider or local exchange carrier (LEC) or anywhere else within the public switched telephone network). In advance of telephone call 12, user 10 may configure personal data elements corresponding to the user's telephone number (e.g., elements 1, 2, and 3) via a data interface controller 14 that may be accessed from the user's CPE or by a data network connection, for example. During telephone call 12, data interface controller 14 responds to control signals from user 10 to cause a data transmitter 15 to transmit (i.e., reproduce) specified personal data elements to make them available to the second party.

In one preferred embodiment, the personal data elements include prerecorded audio files of the user speaking the corresponding information. To reproduce an audio file during telephone call 12, data interface controller 14 retrieves the corresponding audio file from data store 13 and transfers it to data transmitter 15 which plays the audio file within telephone call 12 to be heard by second party 11. In another preferred embodiment, the personal data elements in data store 13 include text files (e.g., ACSII text) and data transmitter 15 includes a text-to-speech converter for synthesizing spoken audio signals in response to the prerecorded text to be played within telephone call 12. In yet another embodiment, data transmitter 15 may comprise a separate link, such as a facsimile link or a data network connection, for sending the desired information element(s) to second party 11 outside of telephone call 12. A data network connection can be used to send the preconfigured text within an e-mail message to second party 11 if their e-mail address is known (e.g., automatically determined by the telephone system using a lookup table based on a caller ID or automatic number identification or ANI signal) or to user 10 as a reminder or for forwarding of the e-mail message by user 10 based on their knowledge of the second party's e-mail address.

Figure 2:
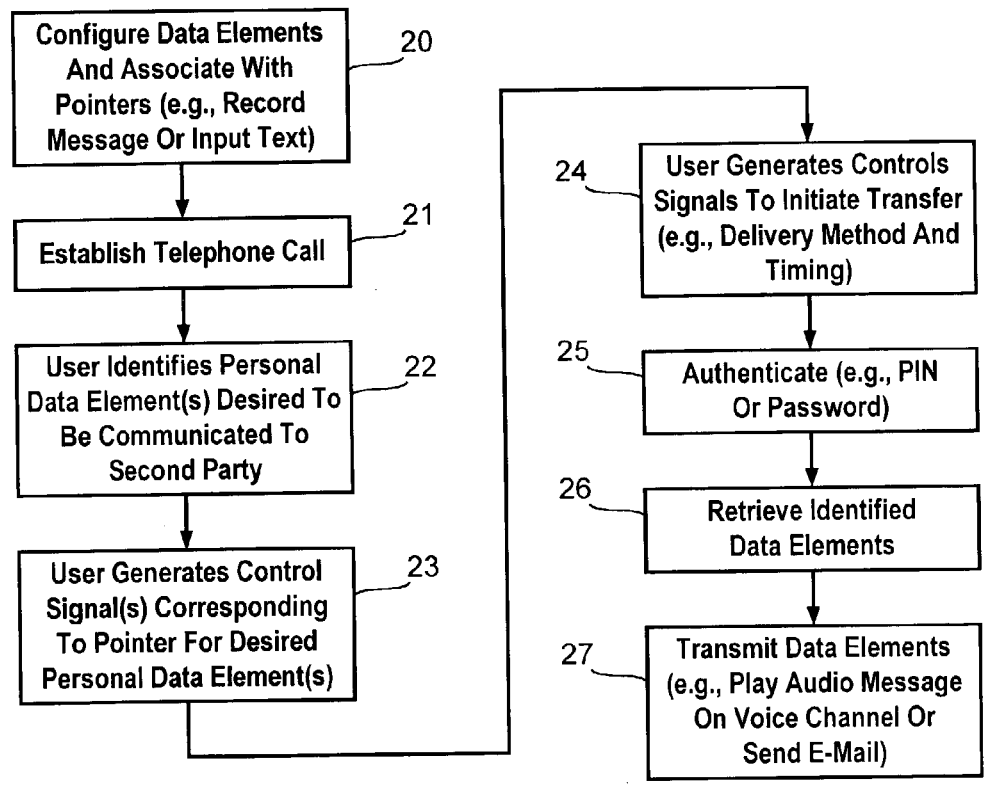
FIG. 2 is a flowchart showing a preferred method of the invention.

The preferred method of FIG. 2 begins in step 20 wherein personal data elements are configured by or on behalf of the user (e.g., the user may provide the desired information elements to the service provider who then actually configures the data store corresponding to the user's telephone number). Each element in the data store is associated with a pointer to be used for identifying a particular data element for retrieval and transmission during a telephone call. The pointers may include predetermined pointers acting as memory locations within the data store or may be user definable codes. Typically, the pointers may comprise sequences of DTMF tones for entering as control signals using the DTMF keypad of a telephone device. For example, the user may record a spoken message providing their street address and associate this recorded message with a DTMF tone sequence of "*" followed by "7" or any other sequence recognizable by a controller coupled to the users telephone device.

In step 21, a telephone call is established between the user and at least one second party. The call can be initiated by either party. During the telephone conversation, the user identifies one or more personal data elements that he or she desires to be communicated to the second party (e.g., an e-mail address of the user and a URL address of a user's webpage). In step 23, the user generates control signals to the data communication system which correspond to the pointer values for the desired personal data elements. For example, the user depresses a DTMF tone sequence on the keypad of the telephone device corresponding to a pointer for a desired personal data element such as the sequence *7 to initiate transmission of a street address data element. The user may generate a plurality of DTMF tone sequences in order to initiate transfer of a plurality of different personal data elements, such as street address, customer number, and credit card number and type for conducting a commercial transaction.

Alternatively, after the service is activated by a particular touch-tone sequence, voice recognition can be used to identify the pointer values for personal data elements to be reproduced. Thus, the user would speak "address" and the utterance would be recognized by a voice recognition function in the data interface controller. A confirmation message would preferably be played using speech synthesis, such as "press 1 if you meant address" or the like.

In one preferred embodiment, personal data elements may be transmitted immediately after entry of the control signals corresponding to their respective pointers. Alternatively, step 24 requires the user to generate additional control signals to initiate the actual transfer by specifying transmission parameters such as the delivery method (e.g., audio reproduction within the telephone call, faxing to a specified telephone number, or e-mailing to a specified e-mail address) and the timing of the delivery (e.g., immediately, upon hanging up of the telephone device by the user, or at a deferred time). Where sensitive or private information is to be transferred, step 25 provides for an authentication of the user wherein the input of a personal identification number (PIN) or other password is required before transmission of the personal data elements will occur. The data interface controller may provide an audio prompt asking for entry of the authentication data as part of a data retrieval menu that may be activated by a corresponding control signal, for example. Authentication could alternatively occur upon initial entry into the service before the control signals identifying any particular personal data elements are accepted.

If proper authentication data is received, then the identified data elements are retrieved in step 26 and then transmitted in step 27. The transmitted personal data element may comprise playing back an audio signal based on an audio file or e-mailing of a text file, for example.

Figure 3:
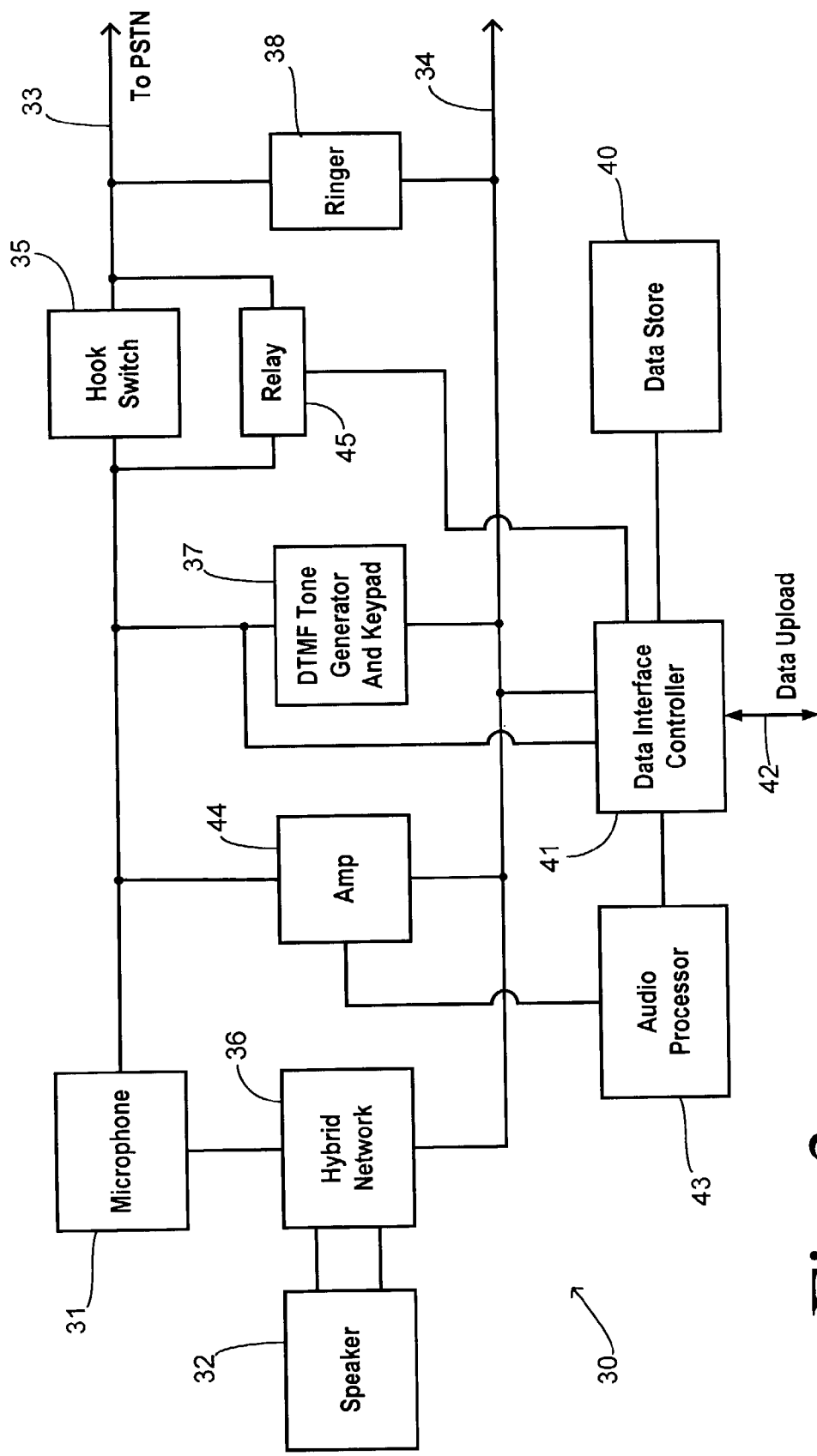
FIG. 3 is a block diagram showing an embodiment of the invention incorporated into customer premises equipment.

FIG. 3 shows an embodiment of the invention wherein the data communication system is contained within a telephone device of the customer premises equipment of the user. Telephone device 30 includes a conventional handset microphone 31 and handset speaker 32 coupled to a telephone line comprising wires 33 and 34 of a subscriber loop via a hook switch 35. A conventional hybrid network 36 is provided for coupling speaker 32 and microphone 31 so that signals generated by microphone 31 are mainly coupled to the telephone line and signals from the telephone line are mainly coupled to speaker 32.

A DTMF tone generator and keypad 37 are coupled to wires 33 and 34 through hook switch 35 to provide dialing tones and control signals in the form of conventional DTMF tones. A conventional ringer circuit is connected between wires 33 and 34 for responding to ringing signals when there is an incoming call.

A data store 40, data interface controller 41, and an audio processor 42 of this embodiment can be implemented using a customized application specific integrated circuit (ASIC) or using a general purpose microcontroller. Data interface controller 41 is coupled to DTMF tone generator 37 to receive control signals during a configuration phase (e.g., when control signals may be used to initiate recording of messages and to identify a desired pointer to be used for a recorded message) and during a usage phase (e.g., when a user navigates a data retrieval menu presented by data interface controller 41). Data interface controller 41 includes an input port 42 for providing an alternative means of configuring the personal data elements (e.g., by data upload from a computer data network or other communication bus).

Audio prompts and/or playback of audio signals is accomplished by an audio processor 43 which may receive audio or text files from data interface controller 41 or directly from data store 40 (not shown). In the case of audio files such as .wav or .mp3 files (including prerecorded user messages and prerecorded audio prompts), audio processor 43 converts the received file to an audio signal in a conventional manner. When using text files, audio processor 43 includes a text-to-speech converter for generating an audio signal comprising synthesized voice that reproduces the text.

The audio signals from audio processor 43 are coupled to the telephone line to be heard by the user and the second party. An amplifier 44 is preferably used for coupling the audio signal and providing an appropriate level for driving the audio signals onto the telephone line.

In one preferred embodiment, telephone device 30 includes a relay 45 connected in parallel with hook switch 35 and controlled by data interface controller 41 to allow the user of telephone device 30 to hang up (i.e., return their handset to its cradle) before the playing back of prerecorded messages is finished, without causing the telephone call to be terminated. Thus, data interface controller 41 closes relay 45 while reproducing a personal data element so that the opening of hook switch 35 has no effect on the call and cannot be detected until the playing back of data elements is finished, at which time data interface controller 41 opens relay 45. Activation of relay 45 may preferably depend upon receiving an instruction from the user to allow continuation of a call after a hanging up of the handset (e.g., by entering appropriate control signals in step 24 of FIG. 2).

Figure 4:
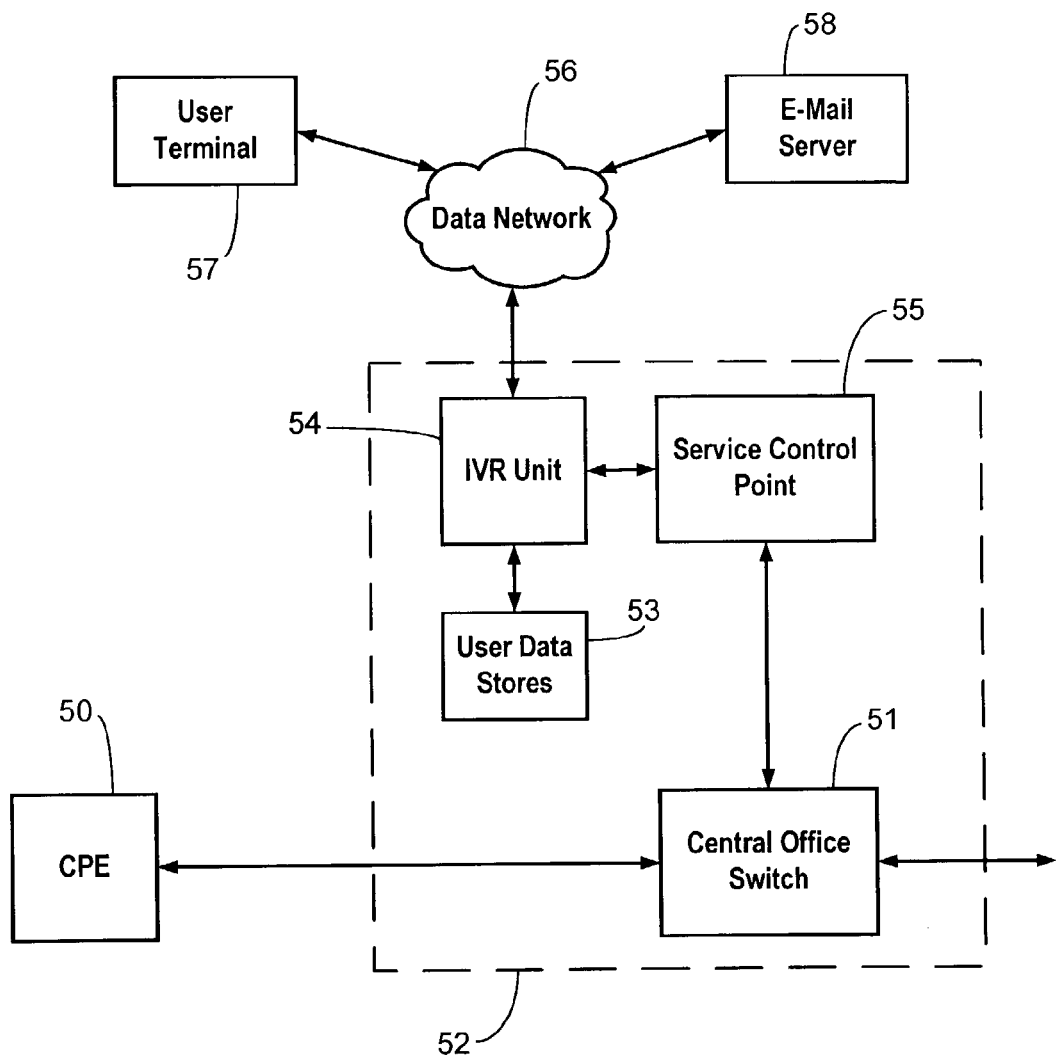
FIG. 4 is a block diagram showing a telephone system for providing a subscriber service according to the invention.

FIG. 4 shows one preferred embodiment of the present invention wherein data messaging is provided as a subscriber service by a telephone service provider such as a local exchange carrier (LEC) or an interexchange carrier (IXC). Conventional customer premises equipment (CPE) 50 is connected to a central office switch 51 in a central office 52. Data stores 53 store respective personal data elements for a plurality of users served by the service provider, with each individual store being associated with the telephone number of the respective user. Data stores 53 are connected to an intelligent voice response (IVR) unit 54 which is a conventional unit that provides automated telephone services for receiving incoming telephone calls, playing prerecorded messages and menu prompts, collecting touch tones input by a caller, and executing corresponding computer network actions. IVR unit 54 is connected to central office switch 51 for receiving telephone calls from respective users to configure their personal data elements in a configuration phase of the service. For example, the user dials a predetermined telephone number of IVR unit 54 and navigates through an IVR menu system to store their desired messages associated with appropriate pointers.

IVR unit 54 is also connected to a service control point (SCP) 55 associated with switch 51. As known in the art, an SCP detects control signals (such as DTMF tones from a user) and provides call routing functions for implementing enhanced services according to routing tables, routing statements, and routing trees to determine the disposition of calls based on the dialed number, the calling number, and other call information. During a telephone call between a user and a second party, control signals associated with the data messaging service of the present invention are relayed by SCP 55 to IVR unit 54. For example, the user may enter a predetermined DTMF tone sequence which activates the service for the current telephone call. After recognizing the predetermined sequence, SCP 55 forwards subsequent control signals to IVR unit 54 so that the identified actions and data elements can be processed by IVR unit 54. When prerecorded messages are played back into the existing telephone call, they are preferably injected into the telephone call by IVR unit 54 via an audio bridge/coupler (not shown). Playback of messages can be deferred until after the user hangs up and SCP 55 can keep the call active until playback is completed.

In a further embodiment, the user data elements can be configured using a computer network to access a webpage made available by the service provider. Thus, IVR unit 54 includes a gateway and/or server coupled to a data network 56 which may be a wide area network (WAN) such as the Internet. A user terminal 57 is connected to data network 56 and is used to log on to the server in IVR unit 54 to perform the desired configuration.

Delivery of a data message may also be accomplished as an e-mail message sent within data network 56 using an e-mail server 58. For example, a personal data element may include preconfigured text which is formatted into an e-mail message by IVR unit 54 and forwarded to server 58 using an e-mail address that may be obtained automatically or may be manually input by the user or the second party during the telephone call. IVR unit 54 first attempts to identify an e-mail address of the second party. Preferably, the telephone number of the second party may be identified using caller ID or ANI information from SCP 55. IVR unit 54 may include a general database relating e-mail addresses with telephone numbers for a large group of subscribers and others, and may also include individual subscriber data records that provide a list of e-mail addresses for personal contacts of the subscriber. IVR unit 54 may also be configured with the e-mail address of the subscriber so that if no e-mail address is identified for the second party, then the e-mail message can be sent to the subscriber as a reminder to forward the information to the second party. By providing the reminder as a e-mail message, the user can forward the data elements by only having to provide an e-mail address of the second party to whom the message is to be forwarded.

A subscriber need not be participating in a call from their subscribed telephone line (i.e., their assigned telephone number) in order to use the data messaging service. Upon activating the service during a telephone call, a user log-in can be provided wherein the user enters their telephone number so that the service provider can access the proper account for the service.

By using preconfigured data elements (such as prerecorded messages) which may be automatically forwarded (e.g., played back) in response to control signals during a telephone call, the user does not have to remember or repeat the frequently used information. The user can save time by having the information delivered after the user has hung up their telephone and gone on to other activities. The recorded messages can be checked for errors prior to use so that incorrect information is not inadvertently conveyed to the other party. Transcription errors can be avoided by employing e-mail delivery of the personal data elements.

What is claimed is:

1. A data communication system comprising:
   a public switched telephone network;
   a telephone device coupled to said public switched telephone network and utilized by a user to participate in a telephone call between said user and a second party;
   a data store contained within said public switched telephone network for storing one or more personal data elements configurable on behalf of said user, said personal data elements stored according to respective pointers, and said data store corresponding to a respective user telephone number;
   a data interface controller contained within said public switched telephone network for retrieving a particular personal data element in response to a user-initiated manual control signal;
   a control signal generator for generating said control signal during said telephone call according to a respective pointer corresponding to said particular personal data element; and
   a data transmitter coupled to said data interface controller for remotely transmitting said particular personal data element retrieved by said data interface controller to said second party.

2. The system of claim 1 wherein said control signal generator is comprised of a DTMF tone generator coupled to a keypad of said telephone device.

3. The system of claim 2 wherein said respective pointer is comprised of a predetermined DTMF tone sequence.

4. The system of claim 1 wherein said data interface controller includes an audio processor for recording spoken messages for configuring said personal data elements.

5. The system of claim 1 wherein said personal data elements include at least one pre-recorded spoken message, wherein said data interface controller includes an audio processor for playing back an audio signal in response to said pre-recorded spoken message, and wherein said data transmitter includes a coupler for inserting said audio signal into said telephone call to be heard by said second party.

6. The system of claim 1 wherein said data interface controller includes a connection to a computer data network for receiving data files to configure said personal data elements.

7. The system of claim 6 wherein said personal data elements include at least an alphanumeric text message, wherein said data interface controller includes a text to speech converter for generating an audio signal in response to said text message, and wherein said data transmitter includes a coupler for inserting said audio signal into said telephone call to be heard by said second party.

8. The system of claim 1 further comprising keep-alive means for maintaining said telephone call after said user hangs up said telephone device until transmission of said particular personal data element to said second party is completed.

9. The system of claim 1 wherein said data transmitter is comprised of an e-mail client for incorporating said particular personal data element into an e-mail message and forwarding said e-mail message to an e-mail server.

10. The system of claim 9 wherein said data store further includes a plurality of recipient e-mail addresses, including an e-mail address of said second party.

11. The system of claim 10 wherein said data interface controller is responsive to said user for configuring said recipient e-mail addresses.

12. The system of claim 10 further comprising an address selector responsive to a caller ID signal of said second party to automatically select said e-mail address of said second party in response to a telephone number corresponding to said second party.

13. The system of claim 9 wherein said e-mail message is forwarded to said user as a reminder to forward said particular personal data element to said second party.

14. The system of claim 1 wherein said data interface controller retrieves a plurality of said particular personal data elements in response to a plurality of said control signals, and wherein said plurality of said particular personal data elements are transmitted sequentially in response to a further control signal.

15. The system of claim 1 wherein said data interface controller further includes an authenticator for authenticating said user during said telephone call and for transmitting said particular personal data element only after a successful authentication of said user by said authenticator.

16. The system of claim 1 wherein said data interface controller generates audio prompts in a data retrieval menu in response to said control signals.

17. A method for communicating data during a telephone call between a user and a second party, said method comprising the steps of:
said user configuring an electronic data store containing a plurality of personal data elements, said personal data elements stored according to respective pointers, said data store being contained within a public switched telephone network and said data store corresponding to a respective user telephone number;
establishing said telephone call between said user and said second party;
coupling a user-initiated manual control signal to a data controller during said telephone call for identifying a pointer to a particular personal data element that said user desires to communicate to said second party said data controller being contained within said public switched telephone network;
said data controller retrieving said particular personal data element from said data store; and
remotely transmitting said particular personal data element from said data controller to said second party.

18. The method of claim 17 wherein said control signal is comprised of a sequence of DTMF tones generated by a telephone device used by said user in said telephone call.

19. The method of claim 18 wherein said respective pointer is comprised of a predetermined DTMF tone sequence.

20. The method of claim 17 wherein said configuring step is comprised of recording spoken messages for respective personal data elements.

21. The method of claim 20 wherein said transmitting step is comprised of playing back a recorded spoken message corresponding to said particular personal data element identified by said control signal.

22. The method of claim 17 wherein said data controller is coupled to a computer data network and wherein said configuring step is comprised of sending said personal data elements from a remote node in said computer data network to said data store via said data controller.

23. The method of claim 22 wherein said personal data elements include at least an alphanumeric text message and wherein said transmitting step is comprised of generating an audio signal in a text to speech converter in response to said text message.

24. The method of claim 17 further comprising the step of maintaining said telephone call after said user hangs up a telephone device used by said user in said telephone call until transmission of said particular personal data element to said second party is completed.

25. The method of claim 17 wherein said transmitting step is comprised of incorporating said particular personal data element into an e-mail message and forwarding said e-mail message to an e-mail server.

26. The method of claim 25 wherein said data store further includes a plurality of recipient e-mail addresses including an e-mail address of said second party.

27. The method of claim 26 wherein said data controller is responsive to said user for configuring said recipient e-mail addresses.

28. The method of claim 25 further comprising the step of selecting said e-mail address of said second party in response to a caller ID signal of said second party generated in response to a telephone number corresponding to said second party when said telephone call is established.

29. The method of claim 25 wherein said e-mail message is forwarded to said user as a reminder to forward said particular personal data element to said second party.

30. The method of claim 17 wherein said user generates a plurality of control signals identifying a plurality of pointers to respective personal data elements, wherein said data controller retrieves a plurality of said personal data elements in response to said plurality of control signals, and wherein said plurality of said personal data elements are transmitted sequentially in response to a further control signal.

31. The method of claim 17 further comprising the step of authenticating said user during said telephone call and transmitting said particular personal data element only after a successful authentication of said user.

32. The method of claim 17 further comprising the step of generating audio prompts in a data retrieval menu in response to said control signals.

33. A subscriber service within a telephone network, said service supplied in connection with an associated subscriber telephone number to provide an automatic transfer of a predetermined item of information to a participant in a telephone call other than the subscriber, said service comprising:

a configurable data store contained within said telephone network for storing said predetermined item of information; and a control system contained within said telephone network for interacting with a user 1) to define said predetermined item of information during a configuration phase of said service before said telephone call is established, and 2) to detect control signals manually generated by said user during a usage phase of said service to initiate relaying of said predetermined item of information to said participant from said data store.

34. The subscriber service of claim 33 wherein said predetermined item of information is relayed by playing an audio signal within said telephone call.

35. The subscriber service of claim 34 wherein said control system relays at least a portion of said audio signal to said participant after said user has left said telephone call.

36. The subscriber service of claim 33 wherein said predetermined item of information is relayed within an e-mail message forwarded to said participant.

* * * * *